(12) United States Patent
Gotterbarm et al.

(10) Patent No.: US 10,029,525 B2
(45) Date of Patent: Jul. 24, 2018

(54) ROAD FINISHING MACHINE WITH PUSHING DEVICE

(71) Applicant: JOSEPH VOEGELE AG, Ludwigshafen/Rhein (DE)

(72) Inventors: Tobias Gotterbarm, Limburgerhof (DE); Thomas Schmidt, Plankstadt (DE)

(73) Assignee: JOSEPH VOEGELE AG (DE)

( * ) Notice: Subject to any disclaimer, the term of this patent is extended or adjusted under 35 U.S.C. 154(b) by 76 days.

(21) Appl. No.: 15/367,506

(22) Filed: Dec. 2, 2016

(65) Prior Publication Data

US 2017/0081810 A1    Mar. 23, 2017

Related U.S. Application Data

(62) Division of application No. 14/459,529, filed on Aug. 14, 2014, now Pat. No. 9,656,525.

(30) Foreign Application Priority Data

Aug. 16, 2013 (EP) .................................... 13004086

(51) Int. Cl.
*B60D 3/00* (2006.01)
*E01C 19/48* (2006.01)

(52) U.S. Cl.
CPC ................ *B60D 3/00* (2013.01); *E01C 19/48* (2013.01); *E01C 2301/08* (2013.01)

(58) Field of Classification Search
CPC ........ B60D 3/00; E01C 19/48; E01C 2301/08
(Continued)

(56) References Cited

U.S. PATENT DOCUMENTS

| 3,889,934 A | 6/1975 | Kamman |
| 4,171,839 A | 10/1979 | Okayasu et al. |

(Continued)

FOREIGN PATENT DOCUMENTS

| CN | 2490023 Y | 5/2002 |
| CN | 102797213 A | 11/2012 |

(Continued)

OTHER PUBLICATIONS

Extended European Search Report dated Jan. 16, 2014, Application No. 13004086.8-1604, Applicant Joseph Voegele AG, 7 Pages.
(Continued)

*Primary Examiner* — Pinel E Romain
(74) *Attorney, Agent, or Firm* — Brooks Kushman P.C.

(57) ABSTRACT

The disclosure relates to a road finishing machine with a chassis and a pushing device. The pushing device comprises at least one docking assembly and at least one absorber unit. The absorber unit is fixed to the chassis of the road finishing machine and comprises at least one piston-cylinder unit which comprises a cylinder and a working piston movable therein which subdivides the piston-cylinder unit into at least one first and one second chambers and is coupled to the docking assembly. The docking assembly may be positioned, by the movably mounted working piston, relative to the chassis between an extended position and at least one retracted position. In the piston-cylinder unit, at least one flow channel is provided between the first and the second chambers for letting a fluid enclosed in the piston-cylinder unit pass through, the fluid being prestressed in the extended position.

20 Claims, 6 Drawing Sheets

(58) Field of Classification Search
USPC .......................................................... 296/134
See application file for complete search history.

(56) References Cited

U.S. PATENT DOCUMENTS

| | | | |
|---|---|---|---|
| 4,174,098 | A | 11/1979 | Baker et al. |
| 5,004,394 | A | 4/1991 | Goodwin et al. |
| 5,396,321 | A | 3/1995 | McFarland et al. |
| 5,765,462 | A | 6/1998 | Mannio |
| 5,984,058 | A | 11/1999 | Danneker |
| 7,556,034 | B2 | 7/2009 | De Miranda Grieco |
| 7,766,403 | B2 | 8/2010 | Alvarsson et al. |
| 8,020,584 | B2 | 9/2011 | Love |
| 9,145,649 | B2 | 9/2015 | Buschmann et al. |
| 9,352,712 | B2 * | 5/2016 | Zhou ....................... B60R 19/26 |
| 9,656,525 | B2 | 5/2017 | Gotterbarm et al. |
| 9,702,427 | B2 * | 7/2017 | Petersmann .............. F16F 9/52 |
| 2010/0266339 | A1 | 10/2010 | Guntert, Jr. et al. |
| 2012/0299270 | A1 | 11/2012 | Buschmann et al. |
| 2015/0048595 | A1 | 2/2015 | Gotterbarm et al. |

FOREIGN PATENT DOCUMENTS

| | | |
|---|---|---|
| CN | 204151654 U | 2/2015 |
| DE | 2243076 A1 | 3/1974 |
| DE | 102011120161 A1 | 6/2013 |
| EP | 2527534 A1 | 11/2012 |
| GB | 1414586 A | 11/1975 |
| JP | S5514389 A | 1/1980 |
| JP | 2010065802 A | 3/2010 |
| JP | 2012241517 A | 12/2012 |

OTHER PUBLICATIONS

Chinese Office Action and Search Report dated Dec. 28, 2015, Application No. 201410380436.8, 7 Pages.
Japanese Office Action dated May 26, 2015, Application No. 2014-161536, 4 Pages.

* cited by examiner

FIG. 7

ROAD FINISHING MACHINE WITH PUSHING DEVICE

CROSS-REFERENCE TO RELATED APPLICATIONS

This application is a division of U.S. application Ser. No. 14/459,529 filed Aug. 14, 2014, which claims foreign priority benefits under 35 U.S.C. § 119(a)-(d) to European patent application number EP 13 004 086.8, filed Aug. 16, 2013, which is incorporated by reference in its entirety.

TECHNICAL FIELD

The disclosure relates to a road finishing machine.

BACKGROUND

A road finishing machine may be used in practice for docking to a truck for material transfer. In the process, it is important that no jerky accelerations are transmitted from the material supply vehicle to the road finishing machine, which could lead to damages in the paving. Consequently, in practice road finishing machines are employed which comprise a pushing device at their chassis in front, seen in the paving direction, by which they may cushion the docking of a material supply vehicle.

The applicant's EP 2 527 534 A1 discloses a road finishing machine with a pushing device movably mounted at the chassis which preferably comprises at least one friction spring as absorbing member. With the latter, the shock-absorption of a truck that docks to it works well, while it turned out that an absorber unit including a friction spring is expensive.

DE 10 2011 120 161 A1 discloses a road finishing machine with a pushing device movably mounted to the chassis, the pushing device being spring-mounted by at least one elastomer structural absorbing body. A disadvantage of this, however, consists in that the elastomer structural absorbing body gets easily soiled and may embrittle by heat or insolation prevailing on the construction site. Once the elastomer structural absorbing body is embrittled, its absorbing properties will also deteriorate.

U.S. Pat. No. 5,004,394 A discloses a road finishing machine having a pushing device mounted to it which, according to a first embodiment, is mounted in an absorbing manner relative to the chassis of the road finishing machine by means of a leaf spring. In another embodiment, the pushing device is fixed to two hydraulic cylinders. The hydraulic cylinders are each connected to a hydraulic circuit which supplies a hydraulic medium to the hydraulic cylinders from outside or which withdraws the hydraulic medium from the hydraulic cylinders. A disadvantage of this consists in that the hydraulic circuit has a complex design and requires a lot of space on the road finishing machine. Moreover, the components employed in the hydraulic circuit, e.g., the hydraulic pump or the control valves, must be serviced at regular intervals. Such a pushing device is expensive to manufacture and difficult to be retrofitted at existing road finishing machines.

SUMMARY

Therefore, it is an object of the disclosure to improve a road finishing machine such that the docking to a material supply vehicle, in particular a truck, may be cushioned such that no jerky impacts are transmitted to the road finishing machine during docking and during material transfer, while the means employed for this may be easily manufactured and attached to the road finishing machine without requiring a lot of space.

According to the disclosure, a road finishing machine is provided with a pushing device which comprises at least one docking assembly and at least one absorber unit. The absorber unit is fixed to the chassis of the road finishing machine and has at least one piston-cylinder unit which comprises a cylinder and a working piston movable at the latter which subdivides the piston-cylinder unit into at least one first and one second chambers and is coupled to the docking assembly. By the movably mounted working piston, the docking assembly may be positioned relative to the chassis between an extended position and at least one retracted position. In accordance with the disclosure, at least one flow channel is provided in the piston-cylinder unit between the first and the second chambers for letting a fluid enclosed in the piston-cylinder unit pass through it, the fluid being prestressed in the extended position.

Moreover, embodiments according to the disclosure may also be employed in a charger vehicle with the pushing device described herein.

By a prestressing force, i.e., a compression force, acting on the fluid already in the extended position in the disclosure, the working piston will remain in the extended position until a force pressing from outside onto the docking assembly, e.g., by a docking truck, exceeds this compression force. The compression force prevailing in the extended position and caused by the pressure of the compressed fluid acting on the working piston is simultaneously the minimum restoring force which is required for returning the working piston from its retracted position back to its extended position.

If in operation of the disclosure, a force is applied from outside to the pushing device mounted to the road finishing machine, e.g., by a docking truck, which force counteracts and exceeds the compression force prevailing in the piston-cylinder unit, the working piston will be pushed into the pre-compressed fluid. Since the pre-compressed fluid may not be displaced out of the closed piston-cylinder unit, it is forced to flow through the flow channel which is provided in the piston-cylinder unit. The retraction of the working piston into the pre-compressed fluid causes an additional compression of the fluid by the volume of the retracting working piston, because the fluid is locked in the cylinder of the piston-cylinder unit and cannot exit from it. This additional compression provides an increase in the compression force along the damping path and results in the spring rate R which will be described below more in detail with reference to FIG. 7.

The highest compression force within the piston-cylinder unit is reached when the working piston comes to a standstill in its retraction movement. While a portion of the force acting on the pushing device from outside is converted into friction and heat, the rest of it will be stored as compressive pressure in the fluid within the piston-cylinder unit.

The compressive pressure on the working piston present in the retracted position causes the working piston to press against the load applied from outside and to finally return to its extended position when the force acting from outside diminishes.

While the working piston is being returned, the fluid flows again through the flow channel, whereby the excessive additionally built-up compressive energy may be slowly relieved. Finally, the compressed fluid emits as much energy as is required for returning the working piston. When the working piston is in its original position again, i.e., in the extended position (position as before retraction), the originally prestressed compression force is applied to it again. Then, the pushing device is ready for action again.

The disclosure also relates to a method for cushioning a load acting on a pushing device of a road finishing machine, where a prestressing force caused by a fluid locked in the absorber unit is acting on a working piston of a closed piston-cylinder absorber unit in an extended position, which force pushes the working piston in the direction of the extended position, while the working piston is being pushed into the absorber unit by a load counteracting and exceeding the prestressing force, so that the prestressing force present in the fluid increases, and wherein the fluid flows through at least one flow channel provided in the piston-cylinder absorber unit, so that it is displaced from a first chamber, in which the fluid is nearly completely in the extended position, into a second chamber of the piston-cylinder absorber unit which is formed by the working piston driving into the piston-cylinder absorber unit, where the working piston automatically returns to its extended position when the load on the working piston is relieved. The working piston is slowly returned to the extended position when the load is removed.

Preferably, the prestressed fluid is a highly compressible fluid, in particular a liquid, such as silicone oil. The silicone oil offers excellent compression properties and may be compressed to about 20% of the present volume. The compressibility of silicon oil permits to manufacture very strong absorber units of small dimensions. According to a particular embodiment, the silicone oil is a polydimethylsiloxane (PDMS) which exhibits high compressibility and also excellent lubrication properties.

It is also advantageous for the flow channel, or a plurality of flow channels, to be embodied in the working piston. Preferably, the flow channel is provided in a piston plate of the working piston. The flow channel may be oriented in the piston plate along an adjustment travel of the working piston, where it is also possible for the flow channel to be embodied obliquely in the piston plate in order to extend the passage section for the fluid. This permits to achieve different absorption degrees or speeds.

According to a further embodiment of the disclosure, at least one one-way valve, i.e., a check valve, is provided in the piston-cylinder unit for letting the fluid locked in the piston-cylinder unit pass when the working piston presses in the direction of the retracted position. When the working piston is returned in the direction of the extended position, the one-way valve shuts off and prevents a passage of the fluid, so that the fluid may only flow through the flow channel. This causes the effect that an insertion of the working piston into the cylinder in the direction of the retracted position causes a lower resistance to the working piston than during the return of the working piston in the direction of the extended position. This has the advantage that the absorber unit or the pushing device according to the disclosure may excellently absorb impacts of a docking load, e.g., a truck, at the road finishing machine according to the disclosure, and that the docking assembly may slowly return to the extended position, whereby no accelerations are transmitted to the road finishing machine.

It may in particular be desired that the one-way valve lets more fluid pass than the flow channel when the working piston presses in the direction of the retracted position. This permits a quick and soft cushioning of the working piston into the prestressed fluid.

It is preferably possible for a flow rate through the one-way valve and/or the flow channel to be variable, for example by an adjusting screw. In such an embodiment, it is useful to provide the one-way valve and/or the flow channel within the cylinder of the absorber unit, so that the adjusting screw is easily accessible from outside. Thereby, the absorber unit could be adjusted to different loads.

A further embodiment of the disclosure provides for the piston-cylinder unit to comprise a guiding section with a guiding piston which is fixed to the working piston. The guiding section takes care that the working piston may be exactly and repeatedly uniformly adjusted within the piston-cylinder unit. The working piston may be excellently guided by the guiding section even if high, non-uniformly distributed loads are acting on the pushing device from outside.

For the guiding piston to easily slide within the guiding section, at least one vent hole is preferably provided in the guiding section. Through this vent hole, air may escape or be sucked in when the guiding piston travels into a retracted position or returns from the latter to its original position. The vent hole may be provided, for example, in an external wall of the guiding section which is embodied as extension of the cylinder of the piston-cylinder unit. As an alternative or in addition, the vent hole may also be provided in the guiding piston to release air from the guiding section to the outside while the working piston is retracting.

Preferably, a mounting bore is provided in the working piston for fixing the working piston for mounting the guiding piston on it. According to a further embodiment, a further bore, preferably a tapped bore, is provided in an external wall of the guiding section which bore is, in the extended position, aligned with the mounting bore provided in the working piston, so that a fixing pin may be inserted through these bores to fix the working piston for mounting the guiding piston. Thus, it is possible to firmly fix the guiding piston on the working piston. Optionally, the guiding piston may be fixed and aligned on the working piston by a tension pin.

According to a preferred embodiment, the guiding section has a guiding bushing within which the guiding piston is movable. The guiding bushing may, according to one embodiment, be made at least partially from polyoxymethylene (POM), making the guiding piston slide easily in the guiding bushing.

For the guiding bushing not to slip out of the guiding section, according to a further embodiment, a scraper may be provided in the guiding section which secures the guiding bushing in the guiding section. The scraper is preferably provided at the edge of the guiding section, so that it is easily accessible and removable to replace the guiding bushing if required. Preferably, the scraper is at least partially made of a thermoplastic elastomer, whereby it exhibits improved abrasion properties and the guiding piston may easily slide along it.

Preferably, a pressure within a range of 30 bar-120 bar, preferably 70 bar-110 bar, and in particular within a range of 80 bar-100 bar, prevails in the already prestressed fluid. Thereby, excellent absorbing properties result from the prestressed fluid.

Preferably, the piston-cylinder unit has a piston bearing which guides the working piston. The cylinder is closed by the piston bearing and the cylinder bottom. For a particularly stable mounting of the piston bearing at the cylinder of the piston-cylinder unit, the piston bearing is screwed into the cylinder by means of a thread. Preferably, a valve is provided in the piston bearing through which the piston-cylinder unit may be filled with the fluid.

Preferably, at least one sensor unit or one sensor is installed at the road finishing machine which monitors a position of the pushing device. This is preferably a contactless sensor which detects the position of the docking assembly relative to the chassis and/or the position of the working piston and/or the position of the guiding piston to detect the docking of a truck. The sensor may be fixed, for example, directly to the chassis and/or to the pushing device, in particular, however, to the absorber unit. It would also be conceivable to provide, as an alternative or supplement to the sensor unit, a sensor within the absorber unit which is configured to detect the pressure acting on the fluid to determine, in relation to it, a position of the working piston and thus also the covered damping path.

According to a further embodiment of the disclosure, the road finishing machine provides a signal device which is operatively linked to the sensor to indicate an operator of the road finishing machine whether a truck has docked to the pushing device for material transfer. The signal device is preferably provided in the control panel of the road finishing machine and/or at an external control platform which is available as control panel for the operators at the rear at the screed of the road finishing machine. It is also possible to provide the signal device or an additional signal device at one or both outside mirrors of the road finishing machine to indicate the preceding truck driver the docking status. For example, the signal device may comprise a traffic light display which lights up in different colors depending on the docking status. It is also conceivable for the signal device to emit acoustic signals as an alternative or supplement to the optical display. This permits a secure docking or undocking of a truck for material transfer to or from the road finishing machine according to the disclosure.

A further embodiment of the disclosure provides that, depending on the position of the pushing device, in particular of the docking assembly relative to the chassis of the road finishing machine, maneuvering instructions may be displayed to the road finishing machine's driver and/or the truck driver by means of the signal device. For example, the signal device could include a separate optical and/or acoustic signal transmission by means of which it may indicate the road finishing machine's driver and/or the truck driver that the pushing device or the docking assembly is positioned obliquely relative to the chassis, meaning that the truck has docked to the road finishing machine obliquely. Consequently, the truck driver may perform a corresponding compensation maneuver with the truck to orient the truck exactly in the paving direction of the road finishing machine. This permits the paving material to be uniformly poured into the material bunker and the pushing device to be shifted parallel to the chassis during docking, so that docking forces may be optimally absorbed.

Another embodiment of the disclosure provides for the road finishing machine to be configured such that at least one paving parameter and/or at least one paving drive position automatically changes from a paving mode to a docking mode as soon as the truck has docked to the pushing device, and/or the pushing device, in particular the docking assembly, has assumed a predetermined docking position. For example, it is conceivable for the road finishing machine to interrupt its paving drive. On the other hand, it is also possible that only at least one paving speed and/or velocity is decelerated during the paving drive, and/or at least one linear drive travels from the paving position to a docking position when a truck has docked. It is also possible that the road finishing machine according to the disclosure automatically returns from the docking mode back to the normal paving mode if the signal device detects that the truck has undocked from the pushing device. This automatic adaptation of different parameters or driving positions of the road finishing machine during the docking operation takes care that an optimal paving result is achieved and no visible traces remain in or on the road pavement due to the docking procedure.

Embodiments of the disclosure will be illustrated with reference to the following drawings.

DETAILED DESCRIPTION

Detailed embodiments according to the present disclosure are described herein. It is to be understood, however, that the disclosed embodiments are merely examples, and that other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
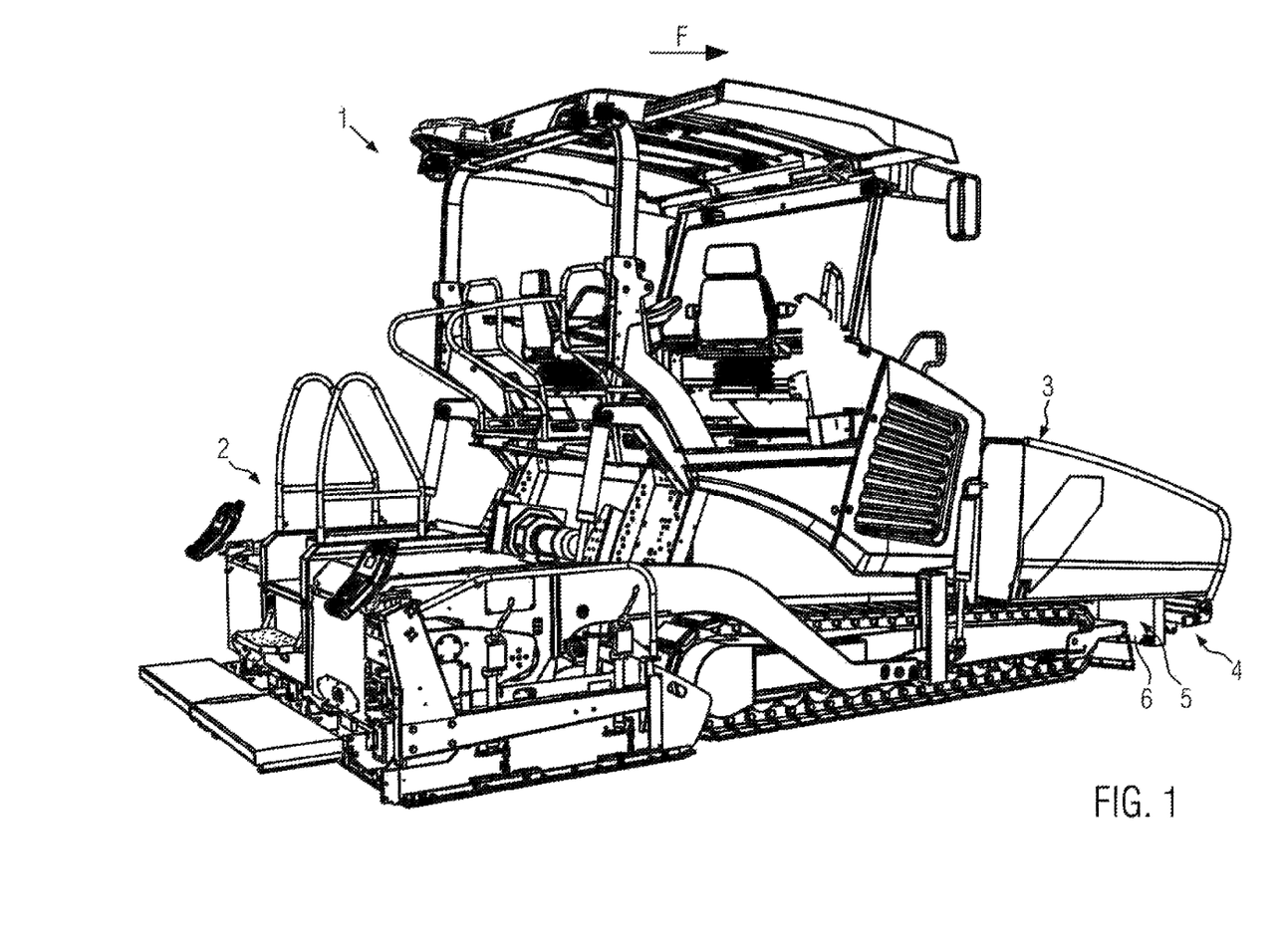
FIG. 1 shows a road finishing machine with a pushing device for docking to a truck.

FIG. 1 shows a road finishing machine 1 with a screed 2 and a material bunker 3 provided in the front, seen in the paving direction F, for receiving paving material. A pushing device 4 in accordance with the disclosure is provided in front of the material bunker 3. The pushing device 4 is mounted at the chassis 5 of the road finishing machine 1. In particular, the pushing device 4 is fixed to a transverse member 6 of the chassis 5.

Figure 2:
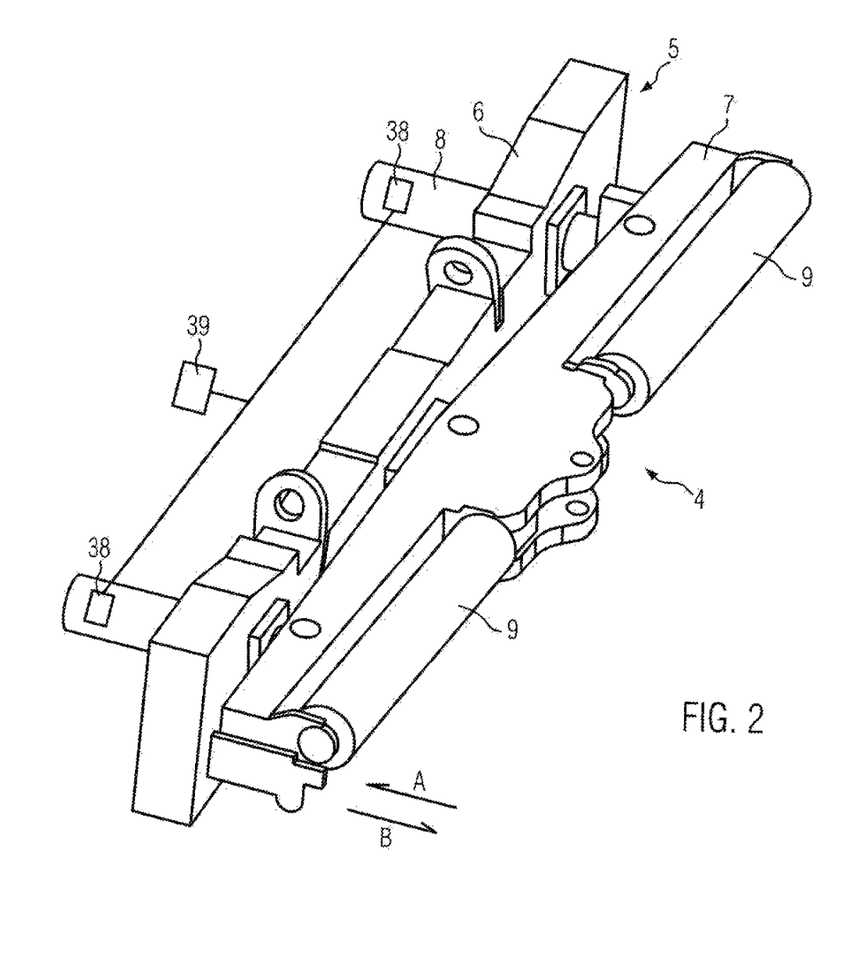
FIG. 2 shows an enlarged perspective representation of the pushing device for docking to a truck.

FIG. 2 shows the pushing device 4 separate from the road finishing machine 1 in an enlarged perspective representation. The pushing device 4 has a docking assembly 7 and first and second absorber units 8. The two absorber units 8 are fixed to the transverse member 6 of the chassis 5. The docking assembly 7 is mounted to be movable relative to the transverse member 6 of the chassis 5. The docking assembly 7 may be moved towards the transverse member 6 and away from it. If a load L is acting on the docking assembly 7 from the front on one side, the assembly may also be inclined with respect to the transverse member 6, as is shown in FIG. 2.

According to FIG. 2, the docking assembly 7 is embodied as transverse beam which supports two rotary pushing rollers 9. The pushing rollers 9 may dock at rear wheels of a truck which pours paving material into the material bunker 3 of the road finishing machine 1. Thanks to the pushing device according to the disclosure, such material transfer is possible during a paving drive without any paving defects occurring in the paving section.

FIG. 2 also schematically shows a sensor unit 38 which is operatively linked to a signal device. The sensor unit 38 is configured to detect a position of the pushing device 4 and forward it to the signal device 39 from which a docking position and/or docking maneuvering instructions may be displayed to the operator of the road finishing machine and/or the truck.

Figure 3:
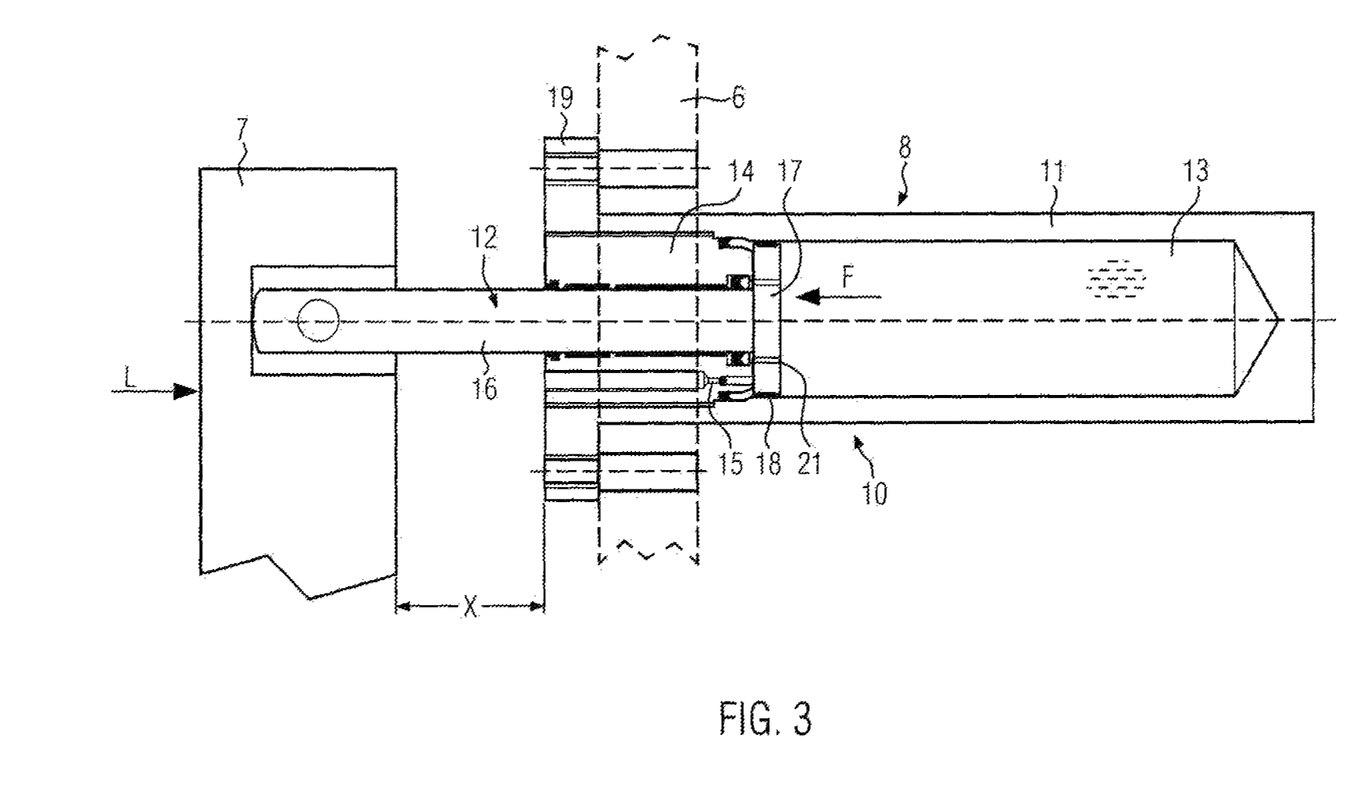
FIG. 3 shows an absorber unit according to the disclosure in an extended position.

FIG. 3 shows the assembly of the absorber unit 8 according to the disclosure in an extended position. The absorber unit 8 is in FIG. 3 fixed to the transverse member 6 of the chassis 5 and includes a piston-cylinder unit 10. The piston-cylinder unit 10 is a closed differential cylinder with a cylinder 11 and a working piston 12 mounted in a pre-stressed manner in the cylinder 11. In the cylinder 11, a pre-compressed fluid 13 is provided which prestresses the working piston 12 in the extended position. The prestressed fluid 13 pushes the working piston 12 against a piston bearing 14. The piston bearing 14 is screwed into the cylinder 11 and closes the cylinder 11 to the outside.

A valve 15 is provided in the piston bearing 14. Through the valve 15, the cylinder 11 of the piston-cylinder unit 10 may be filled with the fluid 13. By filling in the fluid 13, a predetermined pressure may be applied to it, so that it is present in the cylinder 11 in a prestressed or compressed state and thus stores a compression force by which the working piston 12 may be held in the extended position.

The working piston 12 has a piston rod 16 and a piston plate 17. The piston rod 16 is guided in the piston bearing 14 and seals the piston-cylinder unit 10 together with the piston bearing 14. The piston plate 17 has a slightly smaller diameter than the inner diameter of the cylinder 11, a plate seal 18 being provided at the periphery of the piston plate 17. The plate seal 18 prevents the prestressed fluid 13 from flowing, during a movement of the working piston 12, into the cylinder 11 or out of it externally past the piston plate 17. The piston-cylinder unit 10 moreover has a mounting flange 19 which is provided for fixing the piston-cylinder unit 10 at the transverse member 6 of the chassis 5.

The docking assembly 7 is fixed to the piston rod 16 of the working piston 12. The distance between the docking assembly 7 and the mounting flange 19 represents a damping path X. FIG. 3 shows that the docking assembly is positioned in an extended position in which the working piston 12 is pressed against the piston bearing 14 by the prestressed fluid 13. If the working piston 12 is pressed into the cylinder 11 by a force L applied externally at the docking assembly 7, the docking assembly 7 will move towards the mounting flange 19. Simultaneously, the compression force present in the cylinder 11 due to the prestressed fluid 13 will increase because the volume of the working piston 12 in the cylinder 11 will increase.

FIG. 3 also shows that two flow channels 21 are provided in the piston plate 17. When the working piston 12 is pressed into the cylinder 11, the fluid 13 will be forced to flow through the flow channels 21. In the process, the fluid will be displaced from the first chamber right of the piston plate 17 into the second chamber left of the piston plate 17. When the working piston 12 is returned, the fluid 13 will flow back into the first chamber.

Figure 4:
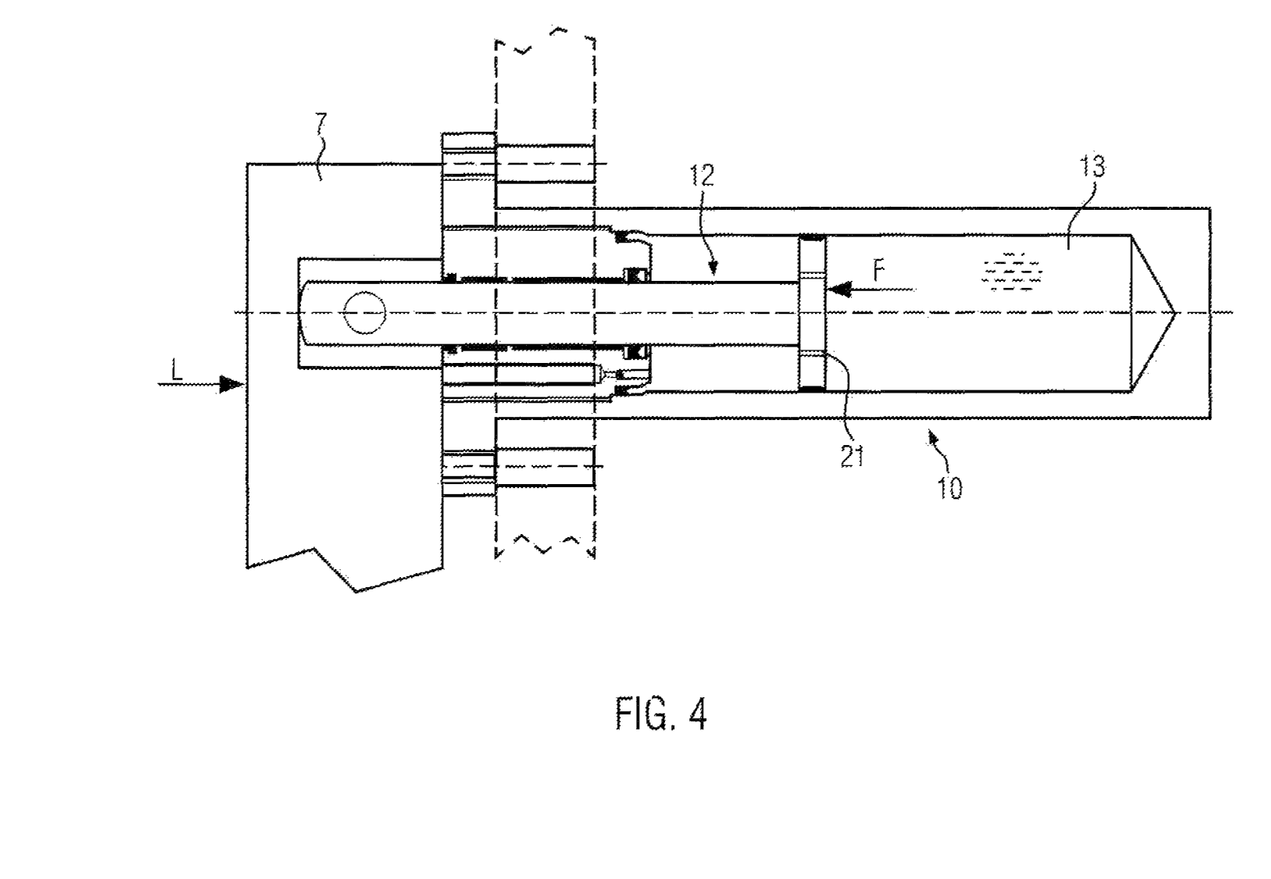
FIG. 4 shows an absorber unit according to the disclosure in a retracted position.

FIG. 4 shows the absorber unit 8 according to the disclosure in a retracted position, wherein the docking assembly 7 is pushed against the mounting flange 19. In FIG. 4, the working piston 12 has passed the complete damping path X, whereby the docking assembly 7 is lying against the mounting flange 9. Here, the working piston 12 is inserted in the cylinder 11 corresponding to the length of the damping path X. The compression force onto the fluid 13 prestressed in the cylinder 11 has thereby increased, whereby additional energy is stored in the fluid 13.

In FIG. 4, the load L applied from outside is higher than the force F originally applied by the prestressed fluid 13. Thereby, the working piston 12 is pushed into the cylinder 11. The working piston 12 is completely returned to its original position according to FIG. 3 if the force L acting from outside falls below the compression force F originally applied by the fluid 13. The working piston 12 will then travel back to the extended position, as is shown in FIG. 3.

Figure 5:
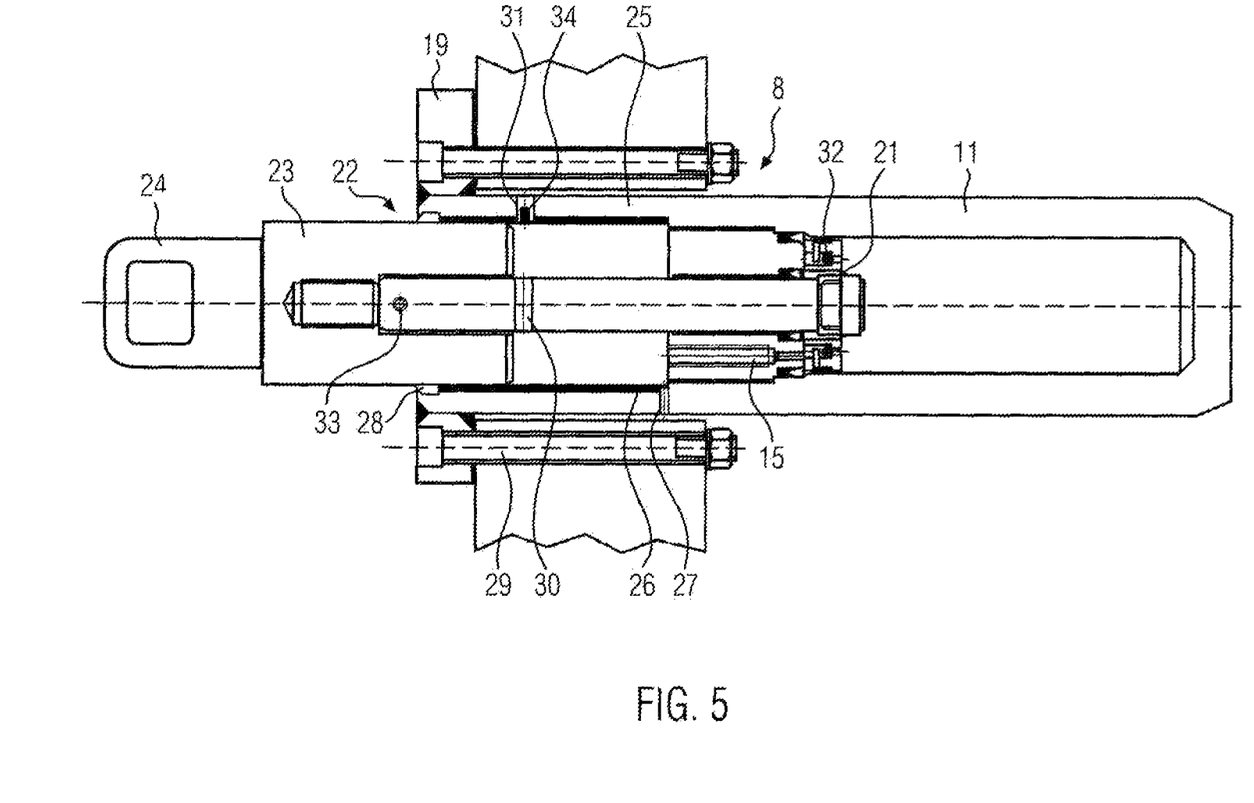
FIG. 5 shows an embodiment of the absorber unit according to the disclosure.

FIG. 5 shows a particular embodiment of the absorber unit 8 according to the disclosure. The absorber unit 8 has a guiding section 22. The guiding section 22 forms an extension of the cylinder 11. The guiding section 22 has a guiding piston 23 which is screwed onto the working piston 12. The guiding piston 23 has a mounting piece 24 which may be coupled to the docking assembly 7. The guiding section 22 furthermore has a cylinder section 25 which is an extension of the cylinder 11 and receives the guiding piston 23 so that the latter is movable within it. In the cylinder section 25, a guiding bushing 26 is provided. The guiding bushing 26 lines the cylinder section 25 and takes care of a uniform sliding motion of the guiding piston 23.

Furthermore, a vent hole 27 is provided in the guiding section 22 which is formed at the bottom of the guiding section 22 in the cylinder section 25. As an alternative or in addition, the vent hole 27 could also be formed in the guiding piston 23. According to FIG. 5, the guiding bushing 26 is secured in the guiding section 22 by a scraper 28. The scraper 28 takes care that the guiding bushing 26 does not slip out of the guiding section 22 during a movement of the working piston 22. The scraper 28 may be designed as a shaped ring and engage in a mounting of the cylinder section 25.

FIG. 5 furthermore shows that the mounting flange 19 is welded to the guiding section 22. By means of several screw connections, the mounting flange 19 is fixed to the transverse member 6. The mounting flange 19 is made of a rectangular sheet preferably having the following dimensions: 173 mm×160 mm×30 mm. In the mounting flange 19, 4 bores are preferably provided. These preferably have a diameter of 18 mm and a hole circle diameter of 110 mm. Preferably, the mounting flange 19 is attached to the transverse member 6 by means of hexagon bolts 29.

For assembling the guiding piston 23, a mounting bore 30 is provided in the piston rod 16 of the working piston 12, which, in the extended position of the working piston 12, is aligned with a tapped bore 31 which is provided in the guiding section 22. During the assembly of the guiding piston 23, a bolt is pushed through the tapped bore 31 and the mounting bore 30, so that the working piston 12 is fixed relative to the guiding section 22. The guiding piston 23 may then be firmly screwed onto the piston rod 16 of the working piston 12. After screwing and securing, the bolt is removed again. The tapped bore 31 is covered by the transverse member 6 and therefore protected from soiling.

In the piston plate 17 of the working piston 12, two one-way valves 32 are provided. The latter may be transferred to an open position when the working piston 12 pushes into the cylinder 11. With a restoring movement of the working piston 12, they will then close automatically, so that the fluid 13 may only flow back through the flow channels 21. This permits to provide only little resistance against the working piston 12 when it is retracted into the cylinder 11, where higher resistance will act against the restoring movement of the working piston 12. Hence, the working piston 12 is slowly moved back into its original position in the extended position.

With reference to FIG. 5, the piston rod 16 of the working piston 12 preferably has a diameter of 30 mm. The damping path X is preferably 80 mm. The initial force onto the working piston 12 applied by the prestressed fluid 13 is preferably within a range of between 200 N and 800 N, but in particular 300 N or 700 N. The blocking force, i.e., the maximum compression force by the fluid 13 which is reached when the working piston 12 has covered the complete damping path X, i.e., when it is completely retracted, is preferably within a range of between 7500 N and 8500 N, in particular, however, 8000 N or 8300 N.

The diameter of the guiding piston 23 is preferably 90 mm. The guiding piston 23 is screwed onto the piston rod 16 of the working piston 12. By means of a tension pin 33, the guiding piston 23 is secured on the piston rod 16. The guiding bushing 26 preferably has dimensions of 90 mm×98 mm×118 mm.

In operation, when a load L from outside acts on the docking assembly 7, the guiding piston 23 retracts into the piston-cylinder unit 10 together with the working piston 12, the working piston 12 immersing into the prestressed fluid 13. The prestressed fluid 13 originally exerts a pressure within a range of 30 bar to 110 bar onto the working piston 12, where it in particular applies a pressure of 43 bar (300 N) or 99 bar (700 N).

Caused by the one-way valves 32 in the piston plate 17, the working piston 12 retracts with relatively low resistance and compresses the prestressed fluid 13 across the spring trajectory by a certain bar value until the blocking force is reached. When the load L acting from outside is removed, the one-way valves 32 will be closed and the working piston 12 together with the guiding piston 23 slowly returns to the extended position because the fluid 13 is now, while it is returning, only forced through the smaller flow channels 21. The returning speed depends on the diameter of the flow channels 21 which may be of different sizes or be variable, depending on the embodiment.

According to a particular embodiment, a proximity sensor 34 may be fixed in the above-mentioned tapped bore 31, which is used for assembling the guiding piston 23, the proximity sensor being embodied for detecting the docking of a load to the docking assembly 7 by detecting an insertion of the guiding piston 23 into the guiding section 22. The proximity sensor 34 may be operatively linked to a non-depicted signal device of the road finishing machine 1 by which the docking of a truck to the pushing device 4 according to the disclosure may be displayed to a driver of the road finishing machine 1 and/or a driver of the docked truck.

Figure 6:
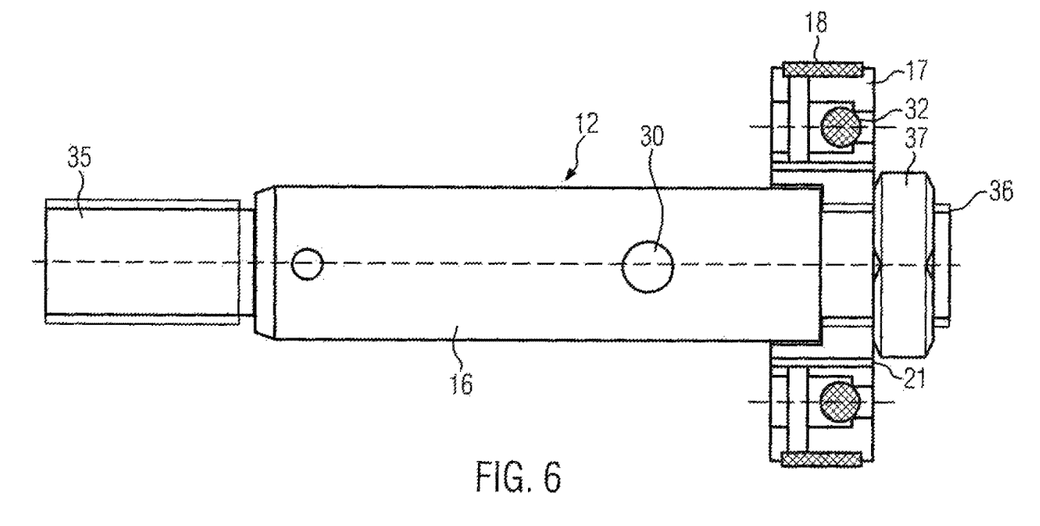
FIG. 6 shows a working piston of the absorber unit according to the disclosure.

FIG. 6 shows the working piston 12 with the piston rod 16 and the piston plate 17. In the piston plate 17, the one-way valves 32 are designed as ball valves. Within the one-way valves 32, the flow channels 21 are provided. The piston plate 17 comprises the plate seal 18 along its circumference. The piston rod 16 has a first threaded section 35 onto which the guiding piston 23 may be screwed, and a second threaded section 36 provided at the opposed end. A screw nut 37 fixes the piston plate 17 on the threaded section 36. FIG. 6 also shows the mounting bore 30 for fixing the working piston 12 during the assembly of the guiding piston 23.

Figure 7:
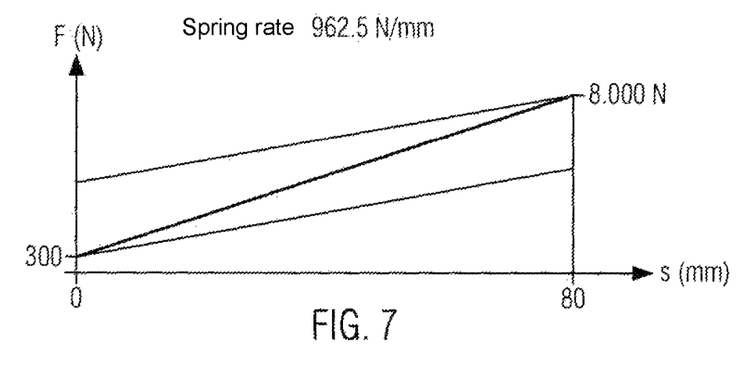
FIG. 7 shows a characteristic force-displacement graph of the absorber unit according to the disclosure.

FIG. 7 shows a force-displacement graph for an absorber unit according to the disclosure. An initial force of 300 N acting on the working piston 12 in the extended position and a blocking force of 8000 N acting on the working piston 12 in the retracted position are characteristic when the working piston 12 has covered the complete damping path X.

According to FIG. 7, the damping path X is 80 mm. Here, a spring rate of 962.5 N/mm results.

By the pushing device according to the disclosure, high loads may be excellently cushioned, while an energy increase may be easily stored and released again in a controlled manner by it. With the pushing device according to the disclosure, it is possible to slow down trucks docking to it without any accelerations being transmitted to the road finishing machine by the docking operation. After the material transfer, the truck may be easily undocked, whereby the pushing device according to the disclosure returns to its original position.

According to the disclosure, the pushing device 4 may just as well be provided at a charger vehicle which docks to a truck for material transfer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finishing machine comprising:
   a chassis; and
   a pushing device comprising a docking assembly and an absorber unit, the absorber unit being fixed to the chassis and comprising a piston-cylinder unit, the piston-cylinder unit comprising a cylinder and a working piston that is movable relative to the cylinder and that separates first and second chambers of the piston-cylinder unit, wherein the docking assembly is coupled to the working piston and may be positioned relative to the chassis between an extended position and a retracted position by the working piston, and wherein the piston-cylinder unit further comprises at least one flow channel provided between the first and second chambers for allowing a fluid enclosed in the piston-cylinder unit to pass through the at least one flow channel, the fluid being prestressed when the docking assembly is in the extended position;
   wherein the road finishing machine is configured to automatically adjust at least one paving parameter and/or a paving drive position when a material supply vehicle has docked to the road finishing machine, and/or when the pushing device has assumed a predetermined position relative to the chassis and/or has covered a predetermined damping path.

2. The road finishing machine according to claim 1 wherein the road finishing machine is configured to automatically adjust the at least one paving parameter when the material supply vehicle has docked to the road finishing machine and/or when the pushing device has assumed the predetermined position relative to the chassis and/or has covered the predetermined damping path, and wherein the at least one paving parameter comprises paving speed.

3. The road finishing machine according to claim 2 wherein the road finishing machine is configured to reduce the paving speed when the material supply vehicle has docked to the road finishing machine and/or when the pushing device has assumed the predetermined position relative to the chassis and/or has covered the predetermined damping path.

4. The road finishing machine according to claim 1 wherein the road finishing machine is configured to automatically adjust the paving drive position from a paving mode to a docking mode so that paving is interrupted when the material supply vehicle has docked to the road finishing machine and/or when the pushing device has assumed the predetermined position relative to the chassis and/or has covered the predetermined damping path.

5. The road finishing machine according to claim 4 wherein the road finishing machine is configured to automatically return the paving drive position from the docking mode to the paving mode when the material supply vehicle has undocked from the road finishing machine.

6. The road finishing machine according to claim 1 wherein the road finishing machine is configured to automatically adjust the paving drive position from a paving mode to a docking mode so that paving is interrupted when the material supply vehicle has docked to the road finishing machine.

7. The road finishing machine according to claim 1 wherein the piston-cylinder unit comprises a guiding section with a guiding piston that is fixed on the working piston.

8. The road finishing machine according to claim 7 wherein at least one vent hole is provided in the guiding section.

9. The road finishing machine according to claim 7 wherein a mounting bore is provided in the working piston for fixing the working piston for assembling the guiding piston.

10. The road finishing machine according to claim 7 wherein the guiding section comprises a guiding bushing within which the guiding piston is movable.

11. The road finishing machine according to claim 10 wherein the guiding bushing is at least partially made of polyoxymethylene (POM).

12. The road finishing machine according to claim 10 further comprising a scraper which secures the guiding bushing in the guiding section.

13. The road finishing machine according to claim 1 wherein the at least one flow channel is disposed in the working piston.

14. The road finishing machine according to claim 13 wherein the pushing device further comprises at least one one-way valve provided in the piston-cylinder unit for allowing the fluid enclosed in the piston-cylinder unit to pass through the at least one one-way valve when the docking assembly moves toward the retracted position.

15. The road finishing machine according to claim 14 wherein the at least one one-way valve is configured to allow more of the fluid to pass than the at least one flow channel when the docking assembly moves toward the retracted position.

16. The road finishing machine according to claim 14 wherein a flow rate through the at least one one-way valve and/or the at least one flow channel is variable.

17. The road finishing machine according to claim 13 wherein the pushing device further comprises at least one one-way valve provided in the working piston for allowing the fluid enclosed in the piston-cylinder unit to pass through the at least one one-way valve when the docking assembly moves toward the retracted position.

18. A method for cushioning a load acting on a pushing device of a road finishing machine, wherein the pushing device includes an absorber unit that is fixed to a chassis of the road finishing machine and that includes a piston-cylinder unit, the piston-cylinder unit including a cylinder and a working piston that is movable relative to the cylinder between a retracted position and an extended position, and wherein a prestressing force caused by a fluid enclosed in the piston-cylinder unit urges the working piston toward the extended position, the method comprising:
　　allowing fluid to flow from a first chamber of the piston-cylinder unit through at least one flow channel provided in the piston-cylinder unit and into a second chamber of the piston-cylinder unit when a load counteracting and exceeding the prestressing force acts on the working piston, so that the working piston moves toward the retracted position; and
　　allowing fluid to flow from the second chamber through the at least one flow channel and into the first chamber when the load on the working piston diminishes, so that the working piston automatically returns to the extended position when the load on the working piston diminishes.

19. The method according to claim 18 wherein the at least one flow channel is disposed in the working piston.

20. The method according to claim 19 wherein the absorber unit further comprises at least one one-way valve provided in the working piston for allowing the fluid enclosed in the piston-cylinder unit to pass through the at least one one-way valve when the working piston moves toward the retracted position, and wherein the at least one one-way valve is configured to allow more of the fluid to pass than the at least one flow channel when the working piston moves toward the retracted position.

* * * * *